United States Patent [19]

Boots

[11] Patent Number: 4,694,717
[45] Date of Patent: Sep. 22, 1987

[54] SINGLE PASS SOD CUTTING MACHINE FOR PRODUCING HEXAGONALLY SHAPED PLUGS

[75] Inventor: Gordon C. Boots, Orlando, Fla.
[73] Assignee: A. Duda & Sons, Inc., Oviedo, Fla.
[21] Appl. No.: 762,296
[22] Filed: Aug. 5, 1985
[51] Int. Cl.⁴ .......................... B26D 3/20; B26D 5/20
[52] U.S. Cl. ......................................... 83/222; 83/223; 83/229; 83/237; 83/620; 83/639; 83/697
[58] Field of Search ................................. 83/32, 42–48, 83/49, 50, 55, 222, 266, 237, 620, 697, 684, 685, 223, 229, 639

[56] References Cited

U.S. PATENT DOCUMENTS

| | | | |
|---|---|---|---|
| 629,785 | 8/1899 | Foster | 83/697 X |
| 660,461 | 10/1900 | Rosback | 83/124 X |
| 1,434,888 | 11/1922 | Guardino | 83/266 |
| 1,436,001 | 11/1922 | Abraham | 83/237 X |
| 1,531,396 | 3/1925 | Head | 83/237 X |
| 1,963,768 | 6/1934 | West | 83/414 X |
| 2,523,178 | 9/1950 | Zeprun | 83/697 X |
| 2,595,305 | 5/1952 | Scott | 83/133 X |
| 3,224,308 | 12/1965 | Dix | 83/620 X |
| 3,263,539 | 8/1966 | Daniels et al. | 83/620 X |
| 3,759,122 | 9/1973 | Lane et al. | 83/620 X |
| 4,187,750 | 2/1980 | Ito et al. | 83/257 X |

*Primary Examiner*—E. R. Kazenske
*Assistant Examiner*—Hien H. Phan
*Attorney, Agent, or Firm*—Julian C. Renfro

[57] ABSTRACT

A machine for cutting coarse sod into relatively small plugs for ready packaging and subsequent transplanting, comprising an endless conveyor belt upon which comparatively large rectangular sections of sod can be deposited, so that the sections of sod can be moved intermittently toward a sod cutting device. The sod cutting device preferably is of the single pass cutter type, utilizing a plurality of elongate, closely grouped blades designed to periodically move in unison downwardly into contact with sod to be cut, with such downward cutting movements being immediately followed by an upward movement, thus to permit an advance of the section of sod without interference. I coordinate the movements of the sod cutting device with the belt advance, such that forward movement of a section of sod is in each instance prevented until the cutting blades are clear of the section of sod being cut. Advantageously, the closely grouped blades are arrayed in an open configuration, such that each time the sharpened lower edges of the blades contact a piece of sod during a cutting movement, a plurality of sod "circlets" are created. Because the blades are not arrayed in the configuration of a complete hexagon or rectangle, no internal stripper need be used to eject sod pieces so that said blades will be kept clear thereof. Also, because the elongate edges of the blades are secured tightly together, a blade array having high columnar strength is created.

12 Claims, 14 Drawing Figures

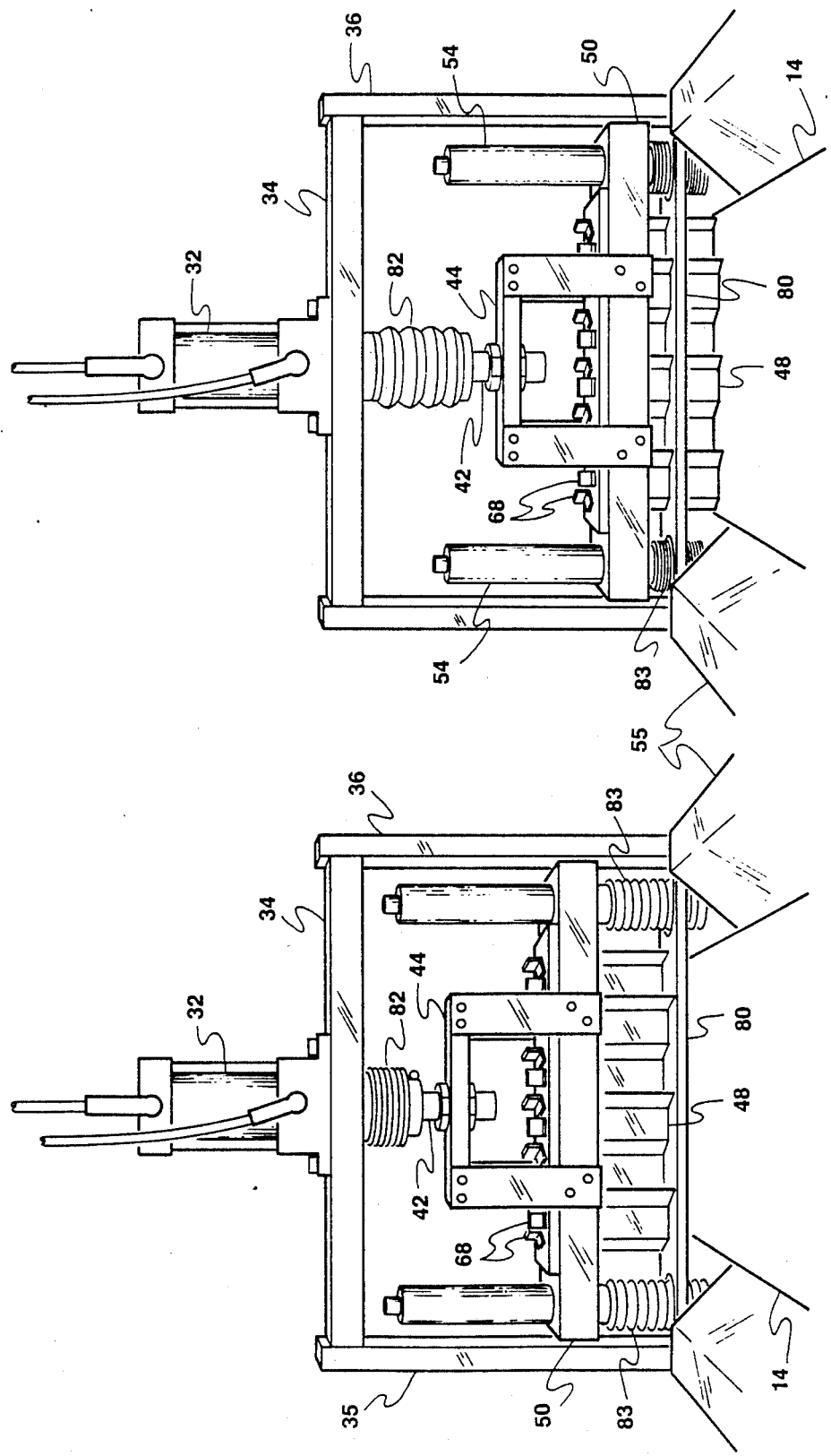

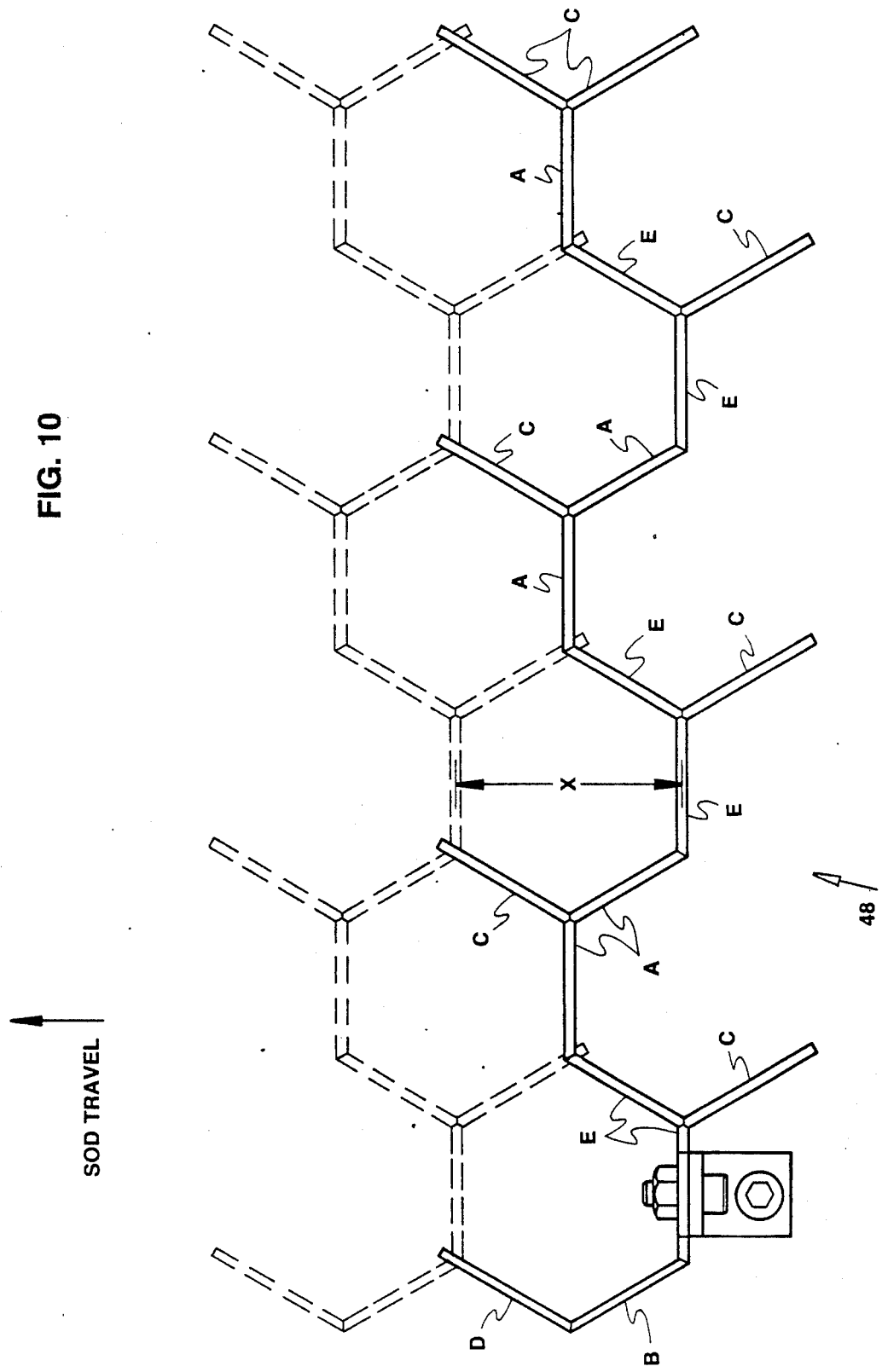

SINGLE PASS SOD CUTTING MACHINE FOR PRODUCING HEXAGONALLY SHAPED PLUGS

BACKGROUND OF THE INVENTION

In the past a number of machines have been proposed for cutting sod into small pieces for transplanting. Zoysia grass has become very popular, and machines for cutting this fine textured grass into small pieces or plugs for transplanting by consumers have been successful. However, such machines have not been successful for other types of grasses, particularly those of coarse texture.

For example, when dealing with Floritam or Bitter Blue varieties of St. Augustine grass, quite a problem is presented by the long "runners" that characterize these grasses, and the cutting of same has been a difficult problem for the Zoysia grass cutting machines to deal with.

Furthermore, whereas even a small plug of Zoysia grass can be expected to grow when transplanted to a suitable location, plugs of St. Augustine must necessarily be considerably larger, for otherwise they simply do not have a high success rate when transplanted. However, the problem of cutting St. Augustine grass into larger plugs by satisfactory means has not previously been solved.

The White, et al U.S. Pat. No. 2,889,878 entitled "Sod Cutting Machine with Gravity Feed Means" has a circular saw blade to cut sod to desired widths, and a shear cutter to cut the newly formed sod strips to a desired length. The Friedberg U.S. Pat. No. 4,043,231 entitled "Apparatus for Trimming and Scoring Cut Sod to Produce Separable Plugs" also uses a rotatable saw blade that serves to cut the sod sections into plugs, but both of these prior art devices require considerable amounts of hands-on efforts, and in addition are quite dangerous, despite safety measures taken to prevent a user from being cut by the blades. Furthermore, more than one pass of a section of sod through the Friedberg machine is necessary if the strips of sod cut as a result of the first pass through the blades are to be further acted upon to convert them into small pieces of sod suitable for transplanting. Therefore, it is to be seen that neither of these machines function automatically, yet entail considerable complexity.

The Dye U.S. Pat. No. 3,509,789 entitled "Sod-Cutting Apparatus" represents a machine that does not use rotating saw blades for cutting sod into small pieces or plugs for transplanting. However, inherent in the Dye design is a slow and tedious operation, in which sod sections are dealt with on a piece-by-piece basis, thus requiring a great deal of hand effort. Therefore, it is to be seen that Dye depends upon the operator for productivity. Dye uses a stationary stripper but this arrangement is not only a manually controlled arrangement, but also it is very dangerous to the operator. Furthermore, this patentee finds it necessary to use a stripper device for preventing the freshly cut plugs from clogging the cutting devices utilized.

The Nunes U.S. Pat. No. 3,807,505 entitled "Sod Handling Machine and Method" machine is a highly complex sod harvester machine, limited to use with elongate ribbons of sod that are to be cut into predetermined lengths. In fact, this may be regarded as a typical sod harvester. Thus, it is to be seen that none of the aforementioned prior art machines is designed for cutting St. Augustine grasses into plugs or circlets, nor do they address the special problems these grasses impose because of their coarse, loose texture.

The Dutch Pat. No. 6405345 of Nov. 17, 1964 is not a sod cutter at all, but apparently is a device for cutting floor tiles or the like, wherein the cutting stroke is short. This patentee utilized cutter array having free standing blades as shown in FIG. 4 of the patent, which blades would be subject to substantial bending, and clearly not able to cut coarse sod into circlets. Although the Dutch device would cut tiles or the like into a hexagonal shape, it utilizes blades strung out over comparatively long distances, hence unsatisfactory from the standpoint of defining a compact arrangement usable in a machine of reasonable size designed to operate in the field. Additionally, the arrangement taught in FIG. 5 of the Dutch patent would result in a considerable amount of wastage along both edges of the device.

It was in accordance with efforts to provide a machine for rapidly and automatically cutting large sections of coarse grass into properly sized pieces or plugs for ready packaging and subsequent transplanting that the present invention was evolved.

SUMMARY OF THE INVENTION

In accordance with this invention I have provided a machine for automatically cutting large sod sections into symmetrically shaped pieces for ready packaging and subsequent transplanting, with this machine being highly satisfactory when used with coarse grasses such as St. Augustine, which have large, hard to cut runners, and which must be cut into much larger plugs than is necessary in connection with certain finer grasses.

My automatic machine comprises sod advancing means in operative combination with non-rotary sod cutting means. The sod advancing means comprises an endless conveyor belt upon which generally rectangular sections of sod can be deposited, which belt serves to intermittently advance the sections of sod toward the sod cutting means. My invention can be supplied with sod sections of the type supplied by a sod harvesting machine of the kind depicted in the Nunes patent.

The sod cutting means involves the use of a plurality of closely grouped blade means designed to move periodically and in unison, downwardly into cutting contact with a section of sod carried on the intermittently movable belt. By virtue of the belt being operative in sequential relation with the sod cutting means, the belt is stationary at the time the blades descend into cutting contact with the sod, with the belt remaining stationary until the blades have thereafter been fully retracted from the sod. Upon the occurrence of this latter, the belt is then advanced for another few inches, forward motion ceases, and the blades are again caused to descend into cutting contact with the sod, with this procedure continuing so as to cut the sod sections into relatively small, symmetrical, easily managed pieces or plugs of sod, that are highly suitable for packaging and transplanting. Although the plugs are literally hexagonally shaped, they are so close to being circular that I call them "circlets" of sod. This is particularly true when it is realized that I prefer for the freshly cut sod plugs to be placed in trays of polystyrene that have circular, vacuum formed, downwardly tapered cup portions to receive the plugs. The plugs typically remain in the trays for a number of days, during which time they receive water and fertilizer. As a result, in a short time the plugs do in fact assume a circular form.

In thereafter setting out my large diameter plugs, the user may choose to employ a cutter of the general type used by golf courses, which are round cutters used for cutting the hole for the cup. The Cummings U.S. Pat. No. 1,791,957 is an example. If the cutter is 3.25 inches in diameter, it will create holes that will readily receive my now-circularly shaped plugs.

Advantageously, my machine in using what I regard as a "single pass cutter configuration" involves blade means which are elongate in the vertical direction, and interconnected so as to provide ample columnar strength. The cutting edges are on the lowermost portions of the blades.

Because the blade array I prefer to use is created in accordance with an open blade design, it deliberately is not of a configuration involving complete hexagons. For that reason, any internal stripper means needed in some machines to remove cut pieces of sod that might otherwise have been trapped within the blade array can be completely eliminated from my machine.

Although other power could be utilized, I prefer for the sod advancing means and the sod cutting means to be powered from a common supply of pressurized hydraulic fluid, such that the necessary sequential relation between the sod advancing means and the sod cutting means may be easily achieved. The speed of operation can be easily regulated by adjusting flow rate. A further advantage of utilizing an all hydraulic system is that no source of electricity is required for the proper operation of my machine, meaning that it can be fully operational even in remote field operations.

The events taking place during the operation of my machine are not timed as such, but rather each event initiates the next. Therefore, I prefer to regard my machine as operating on sequenced events rather than timed events.

It is therefore a principal object of this invention to provide a sod cutter machine for automatically cutting large sections of coarse grass into smaller, symmetrically shaped pieces for ready packaging and subsequent transplanting.

It is another object of this invention to utilize an automatic sod cutter machine for cutting coarse grasses into sod pieces or plugs, requiring neither the use of dangerous, rotary blades, nor the use of internal or spring loaded stripper means for preventing the cut plugs from being distorted and fouling the blades.

It is still another object of this invention to provide an automatic sod cutter machine wherein sod advancing means are utilized in concert with non-rotary sod cutting means, with the cutting movements being accomplished in sequential relationship with the sod advancing means, such that the sod advancing means are not striving to move the sod while the sod cutting is being accomplished.

It is yet still another object of this invention to provide an automatic yet relatively inexpensive machine for cutting coarse grasses into circlets while requiring no great skill for its operation, with my machine being highly adaptable for use in the field, where no source of electricity is available.

It is yet another object of this invention to provide a machine utilizing single pass cutters effective for cutting sod sections into circlets at a rapid rate and without necessitating any type of plug ejection device.

It is yet another object of my invention to provide a single pass type of blade array utilizing elongate blades grouped closely into a compact array and possessing sufficient strength that the blade array can cut easily through sections of heavy, coarse grasses.

These and other objects, features and advantages will be more apparent from a study of the appended drawings.

BRIEF DESCRIPTION OF THE DRAWINGS

FIG. 3 is a view to a somewhat smaller scale, looking along the intermittently movable belt, with the cutting blades being shown in a raised position at the entrance side of the machine;

FIG. 4 is a view quite similar to FIG. 3, but showing the blade array in a lowered position;

FIG. 10 is a plan view of a preferred blade configuration, with it being important to note that the full line blade positions do not define any one complete hexagon;

DETAILED DESCRIPTION

Figure 1:
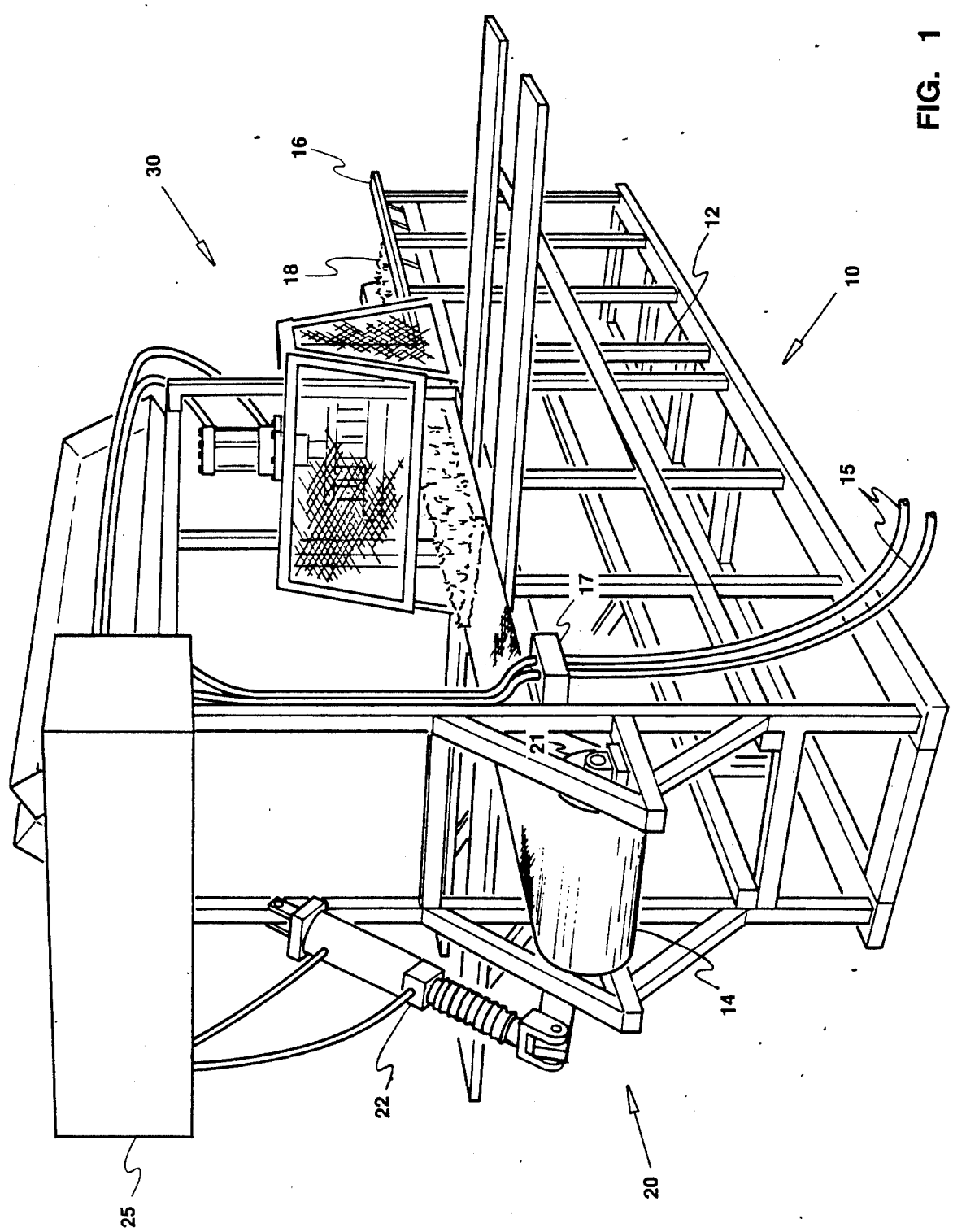
FIG. 1 is a perspective view of a fully automatic sod cutting machine in accordance with this invention, with the movement of sod sections below the sod cutting means being accomplished by the use of an endless, intermittently movable belt moving toward the observer.
Figure 6:
FIG. 6 is a typical circlet or plug of sod as produced by my machine.
Figure 7:
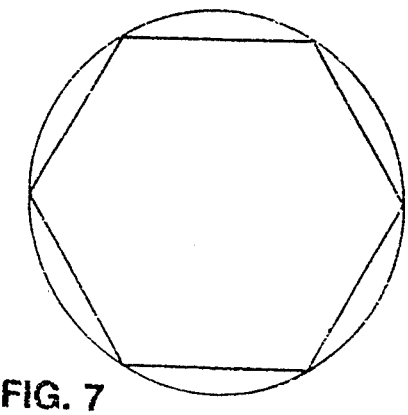
FIG. 7 is a view showing how a hexagonally shaped piece of sod measuring 2.8 inches from flat to flat can be received in a hole 3.25 inches in diameter.

Turning to FIG. 1, it will there be seen that I have illustrated my sod cutter machine 10, which involves an elongate frame 12 upon which an endless conveyor belt 14 is disposed. Stationary sides 16 are provided along the belt 14, to guide the rectangular sections of sod 18 placed on the belt 14. This belt moves intermittently, and serves to bring large sod sections, typically of rectangular shape, one at a time below a reciprocating type of sod cutting means 30. The sod cutting means operate in a sequential relationship to the movements of the belt, with the cutting means serving to cut the sod sections into small circlets or plugs that, in accordance with a primary embodiment of my invention, are of hexagonal configuration, as indicated in FIGS. 6, 7 and 10. Other embodiments are also possible, as will be discussed in connection with FIGS. 12 and 13, wherein means are shown for cutting sod sections into small squares, or possibly rectangles. Other significant details of the sod cutting means 30 will be discussed in detail hereinafter.

Visible in FIG. 1 are a plurality of tray holders 19, upon which may reside vacuum formed polystyrene trays having slightly tapered cup portions designed to receive cut sod pieces. It is intended that several persons stand along the tray holders, lift off the small circlets of sod cut in accordance with this invention, and place them in the cup-shaped portions of the plastic trays. Although not of concern herein, it may be noted that the circlets or plugs of sod are typically kept in the plastic trays for several weeks, in order that proper root development can be brought about by appropriate watering and fertilization. During this period the plugs take on the configuration of the circular cups of the plastic trays, and therefore become fully circular.

My sod cutter machine is preferably powered by hydraulic means, and visible in FIG. 1 is the belt advance means 20, utilizing a driving roll 21 driven intermittently in rotation by a hydraulic actuator 22. The driving roll serves to move the endless conveyor belt 14, and the sod sections carried thereon, in intermittent steps below the sod cutter means 30 I employ. I may from time to time refer to the driving roll 21, the hydraulic actuator 22, and the one-way clutch arrangement illustrated in FIGS. 8 and 9 as the belt advancing means.

The machine depicted in FIG. 1 is controlled by an on-off control valve 17, such as a device made by Gresen of Minneapolis, Minnesota, Model No. SPD 3. The hydraulic controls 25 may be located on the frame 12 above the belt advance means, with the control valve 17 interposed in the hydraulic lines 15 at a location between the source of pressurized fluid (not shown), and the control unit 25. As is apparent, the supply and return lines 15 interconnect the source and hydraulic unit 25, and a pair of hydraulic lines interconnect the unit 25 and each of the hydraulic actuators that I prefer to employ.

Figure 2:
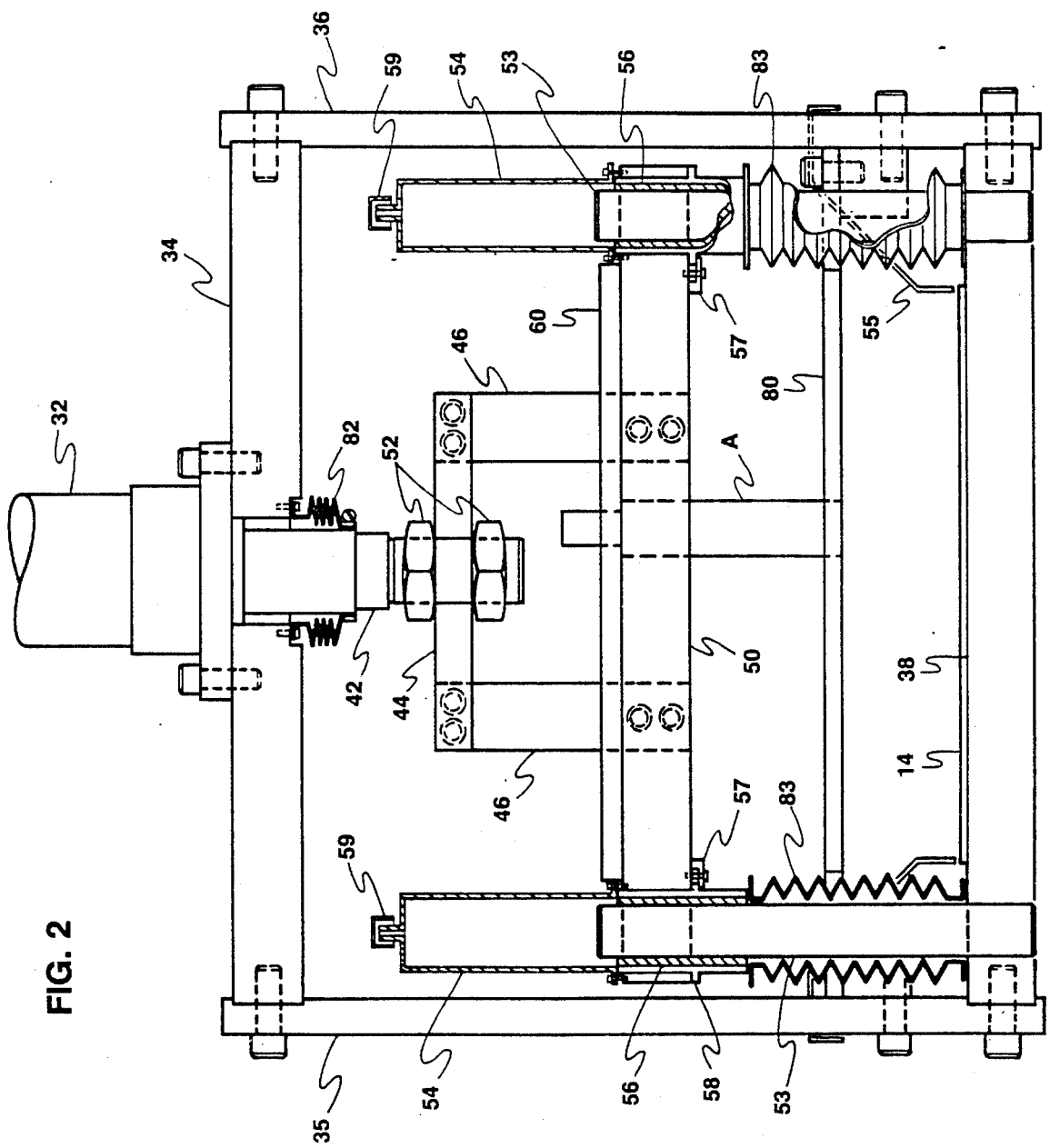
FIG. 2 is a view illustrating some of the principal components of the sod cutting means in accordance with this invention, with certain portions removed in order to reveal internal detail.

Shown generally in FIG. 1, but in more detail in FIG. 2, are some of the principal portions of the sod cutting means 30. The cutting blade array, discussed hereinafter in connection with later figures of drawing, is powered in its vertical travel by a large hydraulic actuator 32. The actuator 32 is firmly bolted to the thick steel support plate 34 of a heavy supporting framework. As shown in FIG. 2, this plate is supported on its left and right sides by plates 35 and 36, that are in turn secured to lower plate 38. The plate 34 has a central hole therein, through which the movable rod 42 of the actuator 32 extends. The plates 34 and 38 are for example of 2" thick steel plate, slightly more than 25 inches wide, and having a dimension of say 6" in a direction perpendicular to the plane of the paper. Quite obviously I am not to be limited to this configuration or these dimensions.

For reasons obvious to those skilled in the art, a hydraulic line extends from each end of the actuator 32 to the control unit 25, so that pressurized fluid may be applied in a controlled manner to a selected end of the actuator. At the same time, fluid is allowed to flow unrestrictedly back from the other end to the reservoir, to permit the piston of the actuator to move. These hydraulic lines connected to the actuator 32 are depicted in FIGS. 3 and 4.

Continuing with FIG. 2, the movable rod 42 of the actuator 32 is connected to a plate 44, which is in turn connected by four vertically disposed connecting members or legs 46 to crosshead 50. One pair of legs 46 is visible at the front corners of the plate 44, whereas the second pair is located behind the first pair, at the rear corners of the plate 44, so as to define an essentially symmetrical connection between the plate 44 and crosshead 50, such that these members are in parallel relation.

As discussed in detail hereinafter, I use a novel configuration of elongate cutting blades extending through the crosshead, with the sharpened bottom portions of this blade array being forced down into the sod carried on the belt 14, by the forcible downward action of the rod 42 of actuator 32 and the crosshead 50. The blade A illustrated in FIG. 2 is representative of one of the twenty or so blades of the blade array 48 described in connection with certain of the later figures. The lower ends of the blades of the blade array extend through suitable apertures in the fixed guide plate 80.

In FIG. 3 I reveal the blade array 48 in the raised position, whereas in FIG. 4 I reveal the blade array in the lowered, sod cutting position.

Returning to FIG. 2, it is to be understood that the lower end of actuator rod 42 in the vicinity of the plate 44 is threaded, with a pair of large nuts 52 being threadedly received on the rod 42, one above and one below the plate 44. By a suitable rotative adjustment of the nuts 52, the proper clearance between the cutting edges of the blade array 48 and the conveyor belt 14 is achieved. On the one hand, it is desirable to be able to exert enough blade pressure downwardly into the sod, so as to cut the sod into circlets, but on the other hand it is not desirable for the cutting edges of the blade array to damage the belt 14.

As should be apparent from FIGS. 3 and 4, as the hydraulic actuator 32 is actuated, the crosshead 50 is moved either downwardly in a cutting mode, to cause the blade array 48 to cut the sod sections into the aforementioned circlets, or else moved upwardly, so as to cause the sharpened edges of the blades of the cutting means to retract so as to be clear of the sod as it is advanced on the belt 14 by the belt advancing means.

The crosshead 50 is constrained in its movements by a pair of die posts 53, best seen in FIG. 2, with these members being supported by the lower plate 38 of the heavy framework previously described. The posts may for example be 1½ inches in diameter, and 13 inches long. As revealed by FIG. 2, a sleeve bearing 56, otherwise known as a plain bearing, is supported near each end of the crosshead 50, and it is through these bearings that the die posts 53 extend. The bearings are held in the desired relationship to the underside of the crosshead 50 by means of clamps 57 acting against a flange 58 that encircles each bearing. The sod may be approximately 16 inches wide, and the centerline of the posts 53 may for example be separated by a distance of approximately 21 inches. Guides or side rails 55 of sheet metal or the like serve to prevent misaligned sod sections from hitting the die posts 53.

Dirt, grit and other undesirable substances are prevented from reaching the active surfaces of posts 53 by the use of die post covers 54, these being shown in detail in FIG. 2. Vents 59 are utilized at the top of each cover 54 to permit the ingress and egress of air as the crosshead 50 moves up and down. It is to be noted that the covers 54 rather than the posts 53 are visible in FIGS. 3 and 4.

Affixed directly to the upper side of the crosshead 50 is the blade support plate 60, that is shown supporting the elongate blade A, typical of twenty or so blades supported in the carefully established blade array 48 by the plate 60. As previously mentioned, the blades of the array extend through precisely configured slots in the crosshead 50.

Figure 5:
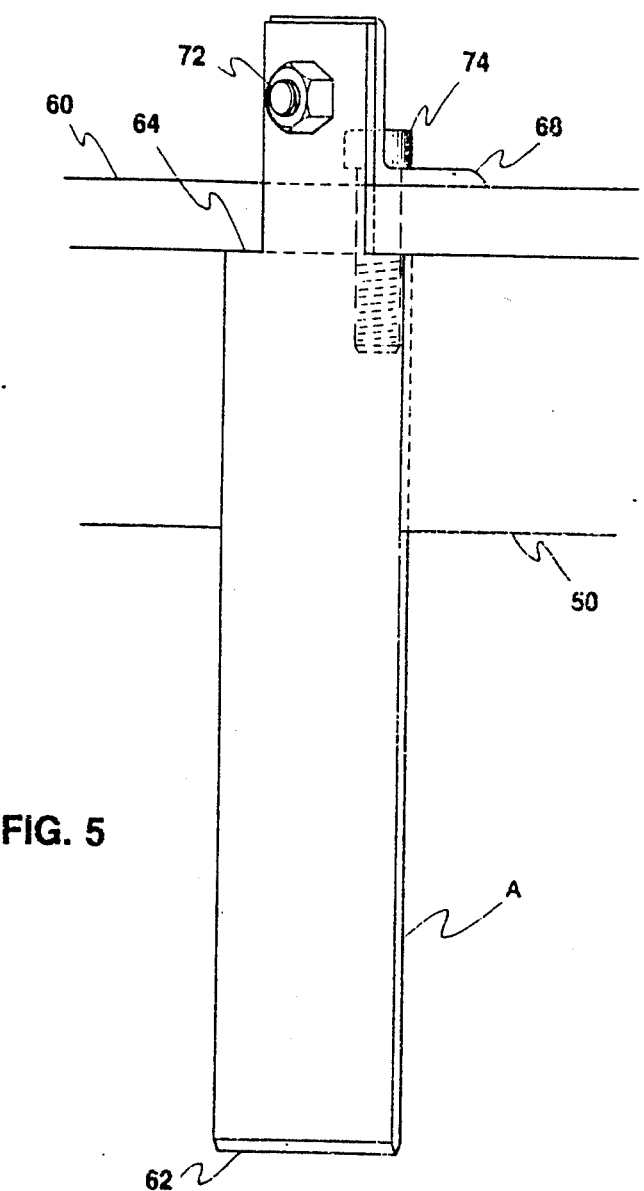
FIG. 5 is a view showing a typical blade used in my novel blade array to cut the sod into hexagonally shaped "circlets", and the mounting for such blade.

With reference to FIG. 5, it is to be understood that the cutting edge 62 of exemplary blade A, coplanar with the cutting edges of the other blades of the carefully configured array, serves with the cutting edges of the other blades of the array to cut the sod into circlets, as will be discussed at greater length hereinafter.

It is to be noted in FIG. 5 that shoulders 64 are provided near the upper end of each blade, that bear closely against the underside of plate 60. This construction assures that the blades do not slide upwardly as the movement of crosshead 50 forces the blade array down into contact with the sod carried on the belt 14. Located in the uppermost portion of blade A is a mounting hole, which is representative of the hole in the top portion of each blade.

Atop plate 60 are a number of angle clips 68, visible to some extent in FIGS. 3 and 4, with the upper leg of each angle clip being bolted to the upper part of the respective blade. As shown in FIG. 5, a short bolt 72 extends through a hole in the upper leg of each clip 68, and the hole 66 in the uppermost portion of each blade, that has been brought into alignment therewith. The lower leg of each clip 68 is secured to the plate 60 and to the upper part of the crosshead 50 by means of a longer bolt 74, with each of latter bolts being of sufficient length that the threads thereof can engage a respective tapped hole in the crosshead 50.

Returning to FIGS. 3 and 4, it is to be remembered that the blade array 48 extends through fixed plate 80, commonly called a "stripper." This plate is firmly mounted between the large side plates 35 and 36 several inches above the conveyor belt 14. The plate 80 contains a number of precisely configured slots, not here visible, through which the array 48 of elongate, vertically operable blades may slidably move. It is important to note that inasmuch as the blade array I use does not define any closed or confined areas, from which plugs must be ejected, I do not find it necessary to use a stripper in the usual sense of the word, where active means such as ejector pins must be utilized to bring about plug removal. Quite clearly the design of my novel sod cutting means is such that no ejection means of any kind is necessary. The plate 80 may be spaced approximately $3\frac{1}{2}$ inches above belt 14, which distance coincides with the stroke of the piston rod 42 of actuator 32, but obviously I am not to be limited to these dimensions.

It is to be noted that I may use an accordion pleated boot 82 around the rod 42 of the actuator 32, and also may use boots 83 around each of the die posts 53. These are desirable inasmuch as some of the sand and soil associated with the sod would otherwise find its way to these sliding surfaces and cause substantial damage thereto. The stripper plate 80 is cut away in the vicinity of the posts 53 as shown in FIG. 2 in order to give adequate clearance for the boots 83 and the lower portions of bearings 56.

Figure 9:
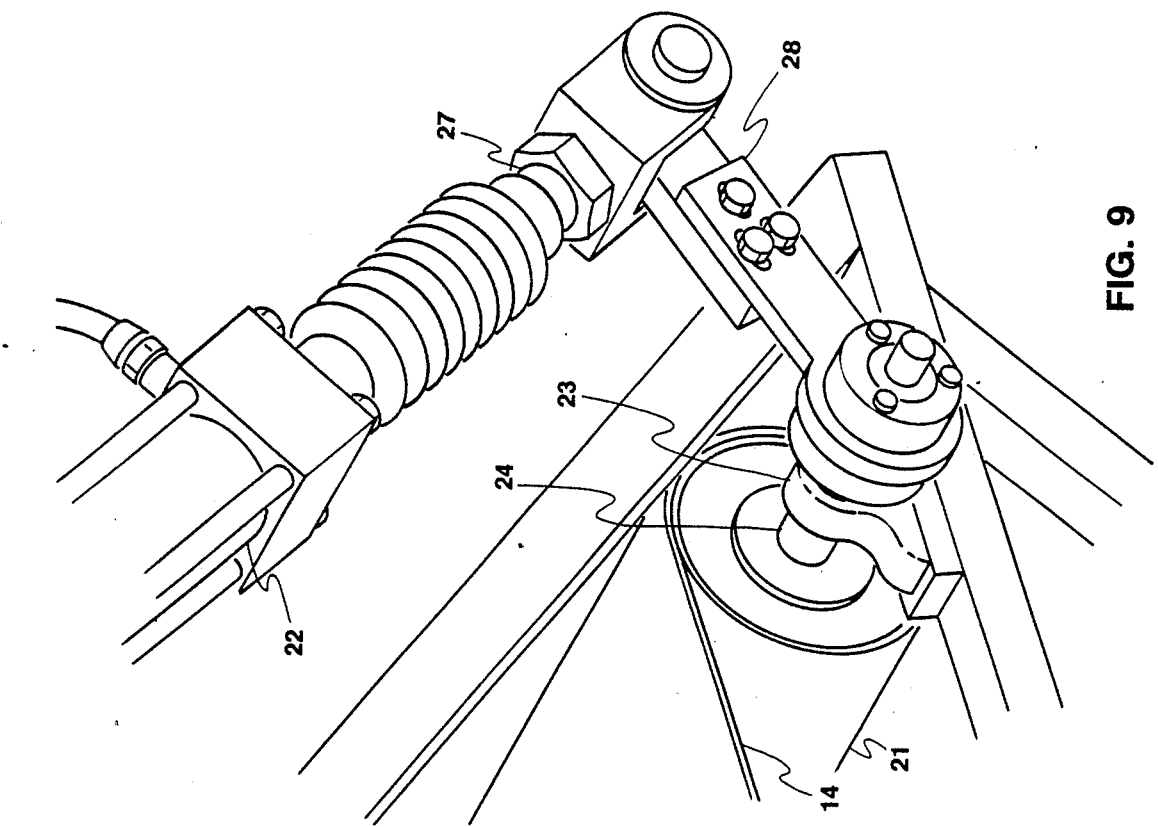
FIGS. 8 and 9 are related views, with FIG. 8 showing the belt advancing means in its rest position, and FIG. 9 showing the belt advancing means having moved to its extended position, to bring about several inches of sod movement.
Figure 8:
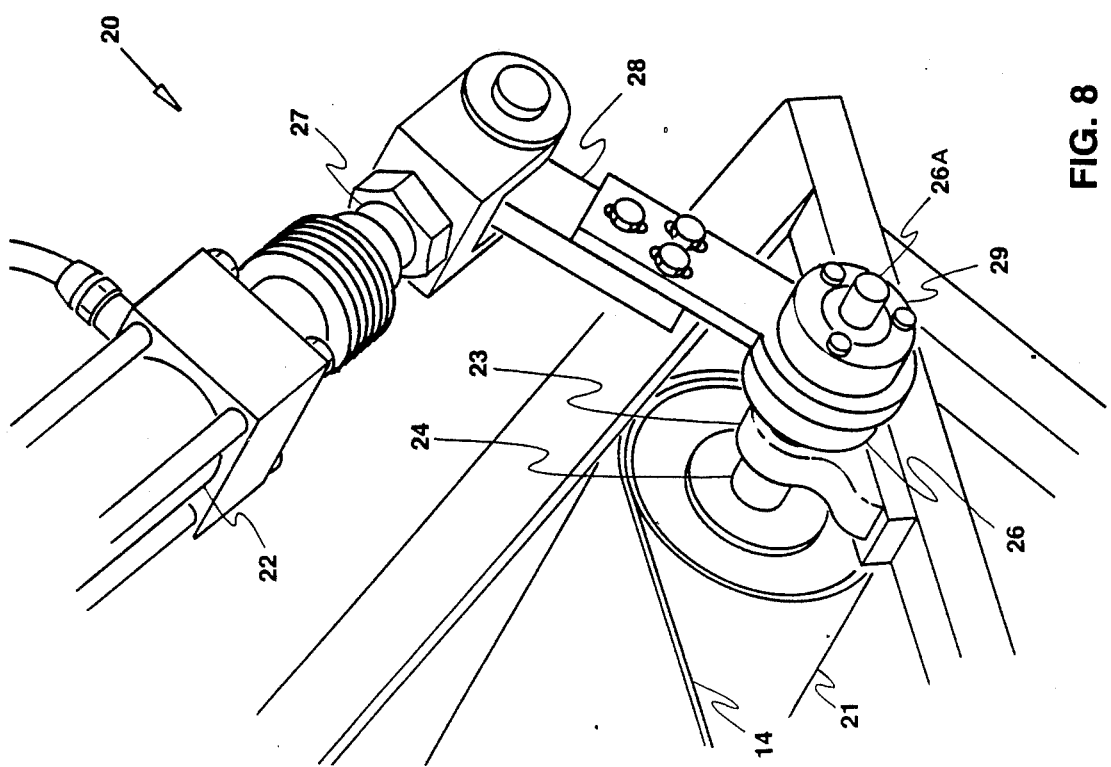

Reference is now made to related FIGS. 8 and 9, wherein I reveal more of the details of the belt advance means 20. On the near end of the driving roll 21 it will be seen that a pillow block 23 mounted on a suitable member of the frame 12 provides a proper bearing and support for axle 24 of driving roll 21. Attached to axle 24 is a uni-directional device, preferably a sprag clutch 26, that permits the movable rod 27 of the actuator 22 to act upon arm 28, to drive the roll 21 in one direction but not the other.

More specifically, as the movable rod 27 of the actuator 22 moves from the retracted position shown in FIG. 8, into the extended position shown in FIG. 9, it acts upon the adjustable-length arm 28. The inner portion of arm 28 is attached by means of a taper locking bushing 29 to the outer shaft 26a of the sprag clutch 26. Therefore, clockwise motion imparted to the sprag unit as viewed in FIGS. 8 and 9 causes it to drive the roll 21 in the direction causing the cut sod circlets 40 to move from left to right. This is the same direction of movement for the circlets as moving on the belt 14 from right to left in FIG. 1. Adjustment of the effective length of arm 28 is made possible by bolts mounted in slots. I prefer for the arm adjustment to be such that the belt is advanced approximately 2.8 inches per actuator stroke, with the result being that the hex shaped "circlets" or small sod pieces measure 2.8 inches across, as illustrated in FIGS. 6 and 7.

Figure 11:
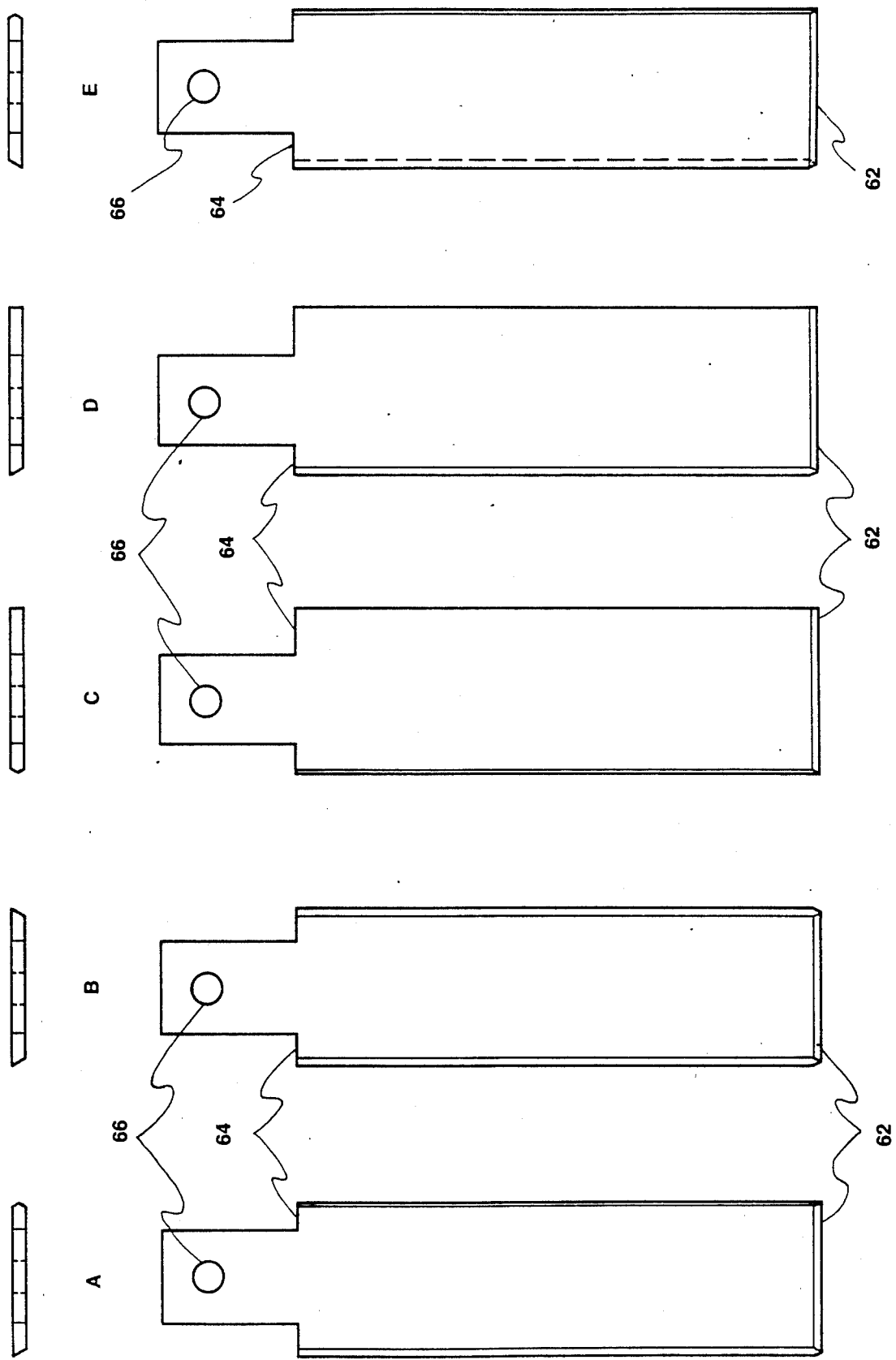
FIG. 11 is a showing of the five different types of blades that may be utilized in bringing about the desired blade array of FIG. 10.

The blades are illustrated in their assembled relation in FIG. 10, which is a plan view. The blades are retained by means of a hole 66 provided at the upper ends of each blade, as visible in FIG. 11, and each has a sharpened lower edge, as previously mentioned. In FIG. 11 I illustrate the different forms the individual blades may take. As was also previously mentioned, these blades are attached to the plate 60 that is affixed to the upper side of the crosshead 50, so as the crosshead is caused by the piston rod 42 of the large hydraulic actuator 32 to move upwardly or downwardly, the cutting edges of the blades are caused to move accordingly, and as a unit. Each of the the several blade arrays I may use will be discussed at greater length hereinafter.

It is to be realized that the cutter array revealed in FIG. 10 is the preferred embodiment, which is made up of a number of discrete blades fastened together to form a very sturdy blade unit. As a result of this construction, the blade array will cut without discernible distortion through the tough sod sections being incrementally advanced below the blades, so that plugs or circlets of the desired configuration will be created. The hexagonal configuration I prefer to use is advantageous for reasons soon to be made apparent, and such plugs are sufficiently close to being circular that they may be regarded as circlets for all intents and purposes. However, I may also use other cutter blade configurations, such as rectangular, as will also be discussed.

In FIG. 10 it is very important to observe from the full line blade positions that an open blade design is used, or in other words, no closed configuration is presented, this design advantageously requiring only a simplified stationary stripper.

From a close study of FIG. 10 it will be seen that the blade array shown in full lines may be construed to form some six "closed" configurations by their interaction with the dashed lines, with the dashed lines connoting the immediately preceding action of the cutter means. Since as previously described, the conveyor belt arrangement I use serves to advance the large, rectangular sod sections through the cutter means 30 intermittently, it can be appreciated that the blades shown in dashed lines in FIG. 10 are in reality the same "single pass" cutter blades as shown in full lines in FIG. 10. The offset between the two showings of blades in this figure is represented by the distance X, which is the distance the sod has been advanced by belt movement from the time the blades descended the first time, until the blades have descended a second time. The distance X can be on the order of 2.8 inches, and it is to be noted that this dimension is determined by the blade configuration used to cut the sod into "circlets". A cutter of the general type used on many golf courses for cutting the hole on each green for the cup may be used. If the users of my sod plugs will use a circular cutter approximately 3¼ inches in diameter, that will result in a hole that will receive a plug that was 2.8 inches on a side when cut; note FIG. 7.

It can be appreciated that the relationship of the intermittently moving belt 14 to the cutters is such that the belt is not trying to move the sod rectangles during the period that the cutter blades are in contact therewith.

It is possible for the large sections of sod on the conveyor belt to shift slightly during the intermittent belt movements, so for that reason I prefer to use approximately a ⅛" overlap between the successive cuts brought about by the cutter array descending into the sod, for in that way I can assure a sufficient cut, thus preventing an unwanted connection between two adjacent plugs. One way of accomplishing this is to have the four forwardly extending "wing" blades and the four rearwardly extending "wing" blades be ⅛ inch longer (i.e. the cutting edges wider) than the other blades, as will be noted in FIG. 10.

It is also to be noted in the blade array 48 of FIG. 10 that the letters A, B, C, D, and E have been applied to certain blades, and by reference to FIG. 11, it will be seen that there are five different types of blades I may use in the creation of the particular blade array illustrated in FIG. 10. This is presented by way of rounding out the description of a particularly advantageous blade arrangement I prefer to use, although I am not to be limited only to this configuration.

With reference to FIG. 11, it is to be understood that all five of these blade types are provided with fastening means at the top, and the cutting edge at the very bottom. Only by way of example, the overall length of each blade in this preferred embodiment was 8¼", with some 1¾ inches at the top of each blade being inserted into the appropriate slot in the blade support plate 60, which slot is approximately 1 inch wide. As earlier indicated, the shoulders 64 used on each blade prevent undesired relative motion at the time sod is being cut, for the blade body in each instance is too wide to move up into the plate 60. However, the slots in the crosshead 50 (not shown) are wide enough to accommodate the full left-right dimension of the blades.

Some 6½ inches of vertical extent of one blade are in direct contact with the corresponding vertical portion of the adjacent blade or blades, although the actual exposure of the blade member below the crosshead is limited somewhat by the crosshead thickness, which thickness may be on the order of 2 inches in the preferred embodiment.

Blade types C and D are revealed by FIG. 10 to have only one vertical, non cutting edge designed to interconnect with the corresponding edge of an adjacent blade, but all of the other blades of the illustrated blade array 48 involve both of their vertical edges being secured to an adjacent blade. Blades C and D are designed to have a slightly wider left-right dimension so as to provide the desired overlap between the successive cuts, as depicted in FIG. 10.

At the left hand edge of FIG. 10, it will be noted that end blade D is in contact with only one other blade, a blade of type B. Therefore blade type D is revealed in the blade cross sections appearing along the top of FIG. 11 to have one edge cut at a 60° angle to the plane of this blade, whereas blade B is revealed to have both its left vertical edge and its right vertical edge cut at a 60° angle to the plane of the blade.

The third blade of FIG. 10 considered from the left side of this figure is a blade of type E, which has one lateral edge cut at a 60° angle to the plane of the blade, and the other lateral edge cut to form a 120° included angle, as is to be seen at the top right corner of FIG. 11. In other words, the right hand edge of this initial blade E of FIG. 11 forms an upper as well as a lower angle of 60° to the plane of this blade.

Connected to the right hand end of the third blade considered from the left side of FIG. 10, namely a first blade E, is a pair of blades, each forming a 120° relationship thereto, with one of these latter blades being of blade type C, namely, having a 120° included angle at one edge, and a flat edge at the other end. The other blade fastened to the third blade is another blade of type E, namely, a blade having a 120° included angle at one end, and a 60° angle to the plane of the blade at its other end, as was previously noted at the upper edge of FIG. 11.

From here on it can be seen that I select the blade type appropriate in each instance in order to form the highly advantageous twenty blade array depicted in FIG. 10, with the blade array 48 in this instance involving these quantities:

| Blade Type | Number Required |
| --- | --- |
| A | 5 |
| B | 1 |
| C | 7 |
| D | 1 |
| E | 6 |

Although other arrangements could perhaps be utilized, I prefer to continuously weld the long vertical edges of adjacent blades together, for this serves to prevent grass portions such as "runners" becoming lodged between the long vertical sides of adjacent pairs of blades.

It is most important to note that after the twenty or so blades have been welded or otherwise secured together to form blade array 48, they represent a very stable unit, that is not subjected to bending or deflecting at the time of cutting the sod. Undesired bending and deflection are of course a major problem encountered by many prior art sod cutting arrangements.

Figure 12:
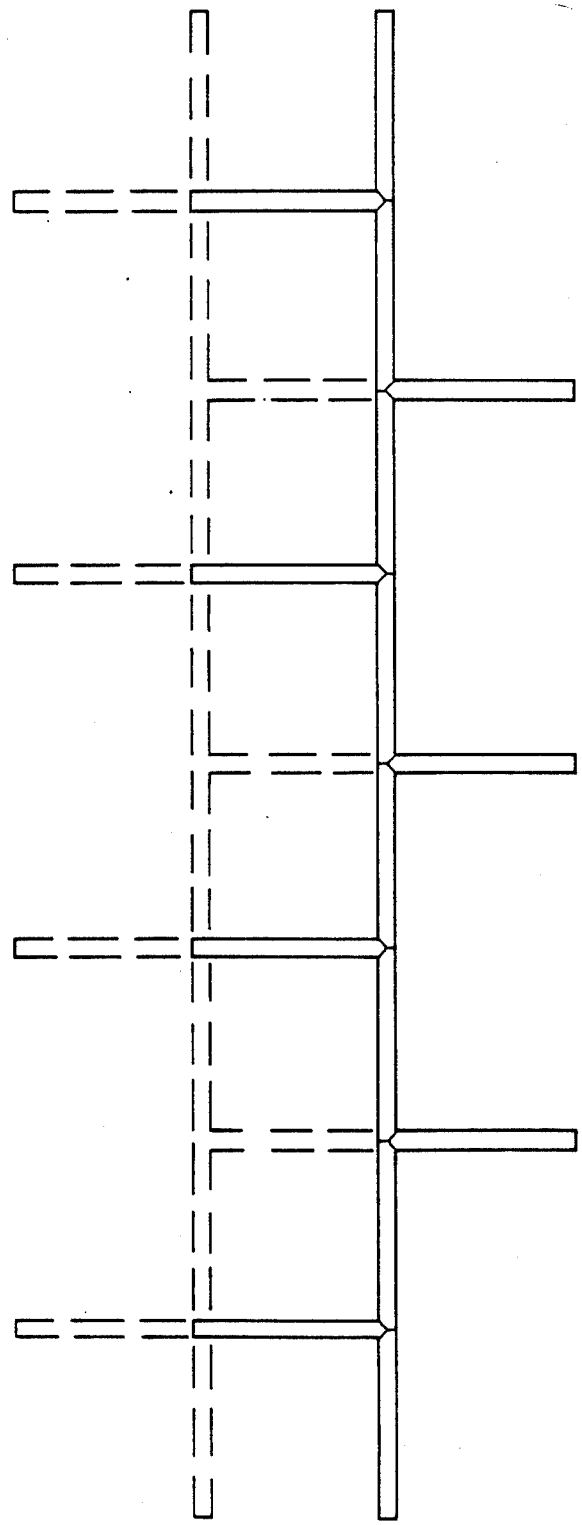
FIG. 12 is an embodiment involving a blade array of simple yet effective construction that is operable for cutting sod into small squares.
Figure 13:
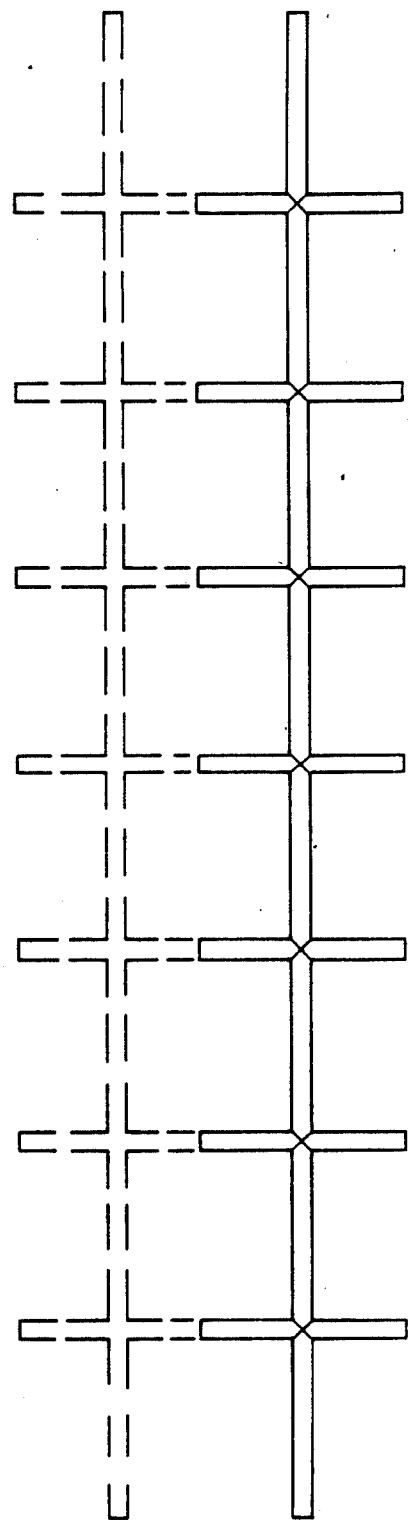
FIG. 13 is another embodiment for cutting sod into small squares, created in a manner slightly different from the embodiment of FIG. 12.

Turning now to FIGS. 12 and 13, it is to be seen that I may utilize blade arrays made up of individual blade members that intersect at 90° angles, which blade arrays serve to cut sod sections into small pieces of square or rectangular shape. These blade arrays are provided primarily for cutting fine textured sod into small squares, and it is to be noted that like the blade array I use for cutting sod into pieces of hexagonal shape, these blade arrays are single pass cutters that do not require the use of ejector pins because of the highly advantageous "open blade principle" that I use.

Although not to be regarded as novel per se, I nevertheless illustrate in FIG. 14, a preferred hydraulic control arrangement 90 associated with movements of the belt advancing actuator 22, hereinafter called ADV, and the sod cutting actuator 32, hereinafter called CUT. Fluid from an inlet location is delivered to a series of distribution valves, so that fluid can be selectively admitted, first to one end of the hydraulic actuators 22 and 32, and thereafter to the opposite end of these devices, such that the desired reciprocating motions can be brought about in the proper sequential relationship. As well known to those acquainted with hydraulic systems, hose connections are made to each end of most hydraulic actuators, so that the hose remote from the end to which pressure is being applied at a given instant will accommodate the return of fluid. The hydraulic controls 25 I utilize, are mentioned in connection with FIG. 1, are concerned with a desirable flow of hydraulic fluid into and out of these two hydraulic actuators.

Depending upon the particular application, I can arrange the sequence of the ADV and CUT actuators in any of several operable relationships, such as the following:

1. Cutter actuator sends cutter down and up, then conveyor actuator advances and retracts.
2. Cutter actuator sends cutter down, then conveyor actuator retracts, then cutter up, then conveyor extends.
3. Cutter actuator sends cutter down and conveyor actuator retracts simultaneously therewith; then cutter actuator sends cutter up, then conveyor actuator extends.

It is to be realized that these procedures are merely cited as being exemplary, and I am not to be limited to any particular procedure.

Figure 14:
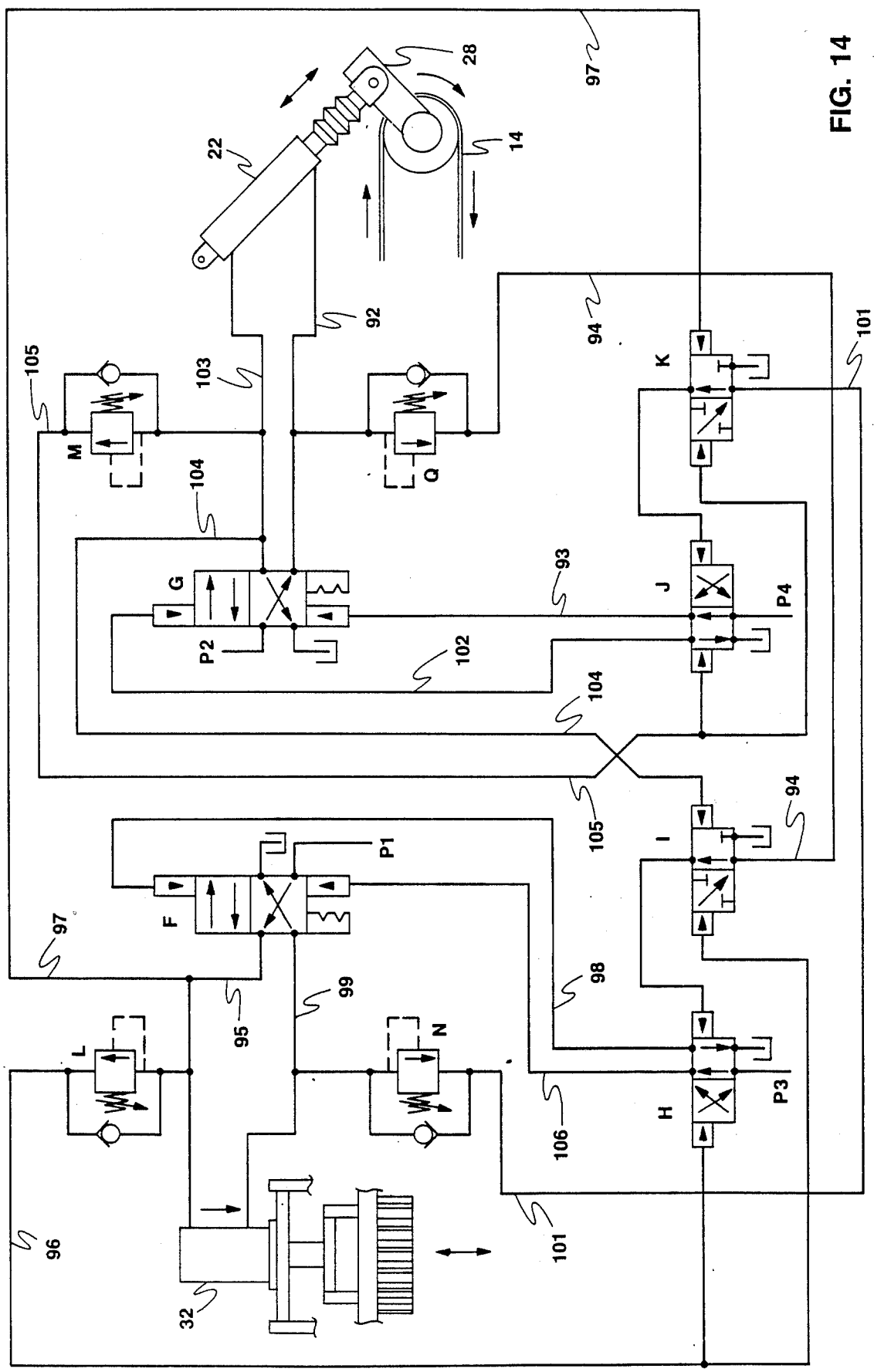
FIG. 14 is a view of a preferred hydraulic arrangement for powering the sod advancing means and the sod cutting means in a highly desirable sequenced relation.

It is to be noted that I prefer to use two position valves F and G in an upper part of the hydraulic diagram shown in FIG. 14, and two position valves H, I, J and K in the lower part of the diagram. Valves F and G are arranged to port large volumes of hydraulic fluid on the occasion of the cutting, and the advancing of sod, whereas valves H through K control the flow of only relatively minute volumes of oil. Although not limited to same, I prefer to use four way valves utilized as two position valves, with these components manufactured by Double A Hydraulics of Manchester, Mich., 48158. These valves are remotely controlled by pilot pressure, and the symbology utilized by Double A Hydraulics has herein been adopted in the preparation of FIG. 14.

Slight enlargements of the hydraulic lines in FIG. 14 at their termination at the valves connote the locations at which the valving efforts are to take place in these hydraulic lines. When the spool used in a valve shifts, that is, from one end to the other, the symbol represented by the rectangle formed by the two squares shifts from one square to the other.

In the instance depicted in FIG. 14, pressure is being applied to extend the CUT actuator 32 by virtue of pressure at $P_1$ flowing through one of the crossed arrows to the line 95 connected to the upper end of the CUT actuator. As is obviously necessary, oil from the bottom of the CUT actuator flows through line 99 and the other of the crossed arrows to the sump.

Continuing with the present example, when in the course of operation the CUT actuator is to be moved upwardly, the spool portion of valve F is caused by pilot pressure to move down, so that pressure from $P_1$ will be manifested through the straight arrow through line 99 to the lower end of the CUT actuator, so that the cutting blades will be retracted from the sod. It is to be understood that generally speaking, this type of operation is repeated throughout the hydraulic system depicted in FIG. 14. It is also to be understood that the four way, two position valves F through K depicted in FIG. 14 are detented so that either the crossed arrow portion of the spool or the parallel arrow portion of the spool is at all times in connection with the hydraulic line ports, with the spools not being permitted to reside in intermediate positions, where blockage of an undesirable nature would occur.

As previously indicated, the four way valves F through K are preferably pilot operated two position valves, in that they are equipped at each end with a small actuator, which in reality may be a piston at the end of each valve spool. Pressure acting on the end of one of these small actuators serves to shift the spool to the other position.

With regard to valves L, M, N and Q, these are sequence valves, that in a sense are a form of relief valve. Although I am not to be limited to any particular manufacturer, I have found that model YSDA Sequence Valves with internal pilot, external drain are satisfactory, these being manufactured by Sun Hydraulics of Sarasota, FL 33580.

For example, valve L is revealed to have a movable portion biased to the right by a spring on the left, and a dashed hydraulic line is shown on the right. The spring bias serves to bias the component, here represented by an arrow, out of alignment with the upper and lower hydraulic connection, so as to prevent flow therethrough. However, upon fluid pressure being manifested through the internal porting represented by the dashed line, the bias of the spring is overcome, the arrow is brought into alignment with the upper and lower connecting tubes, which is a representation of the situation when fluid flow can take place through the device.

Continuing with further consideration of FIG. 14, it will be seen that I have shown ADV actuator 22 and CUT actuator 32 in appropriate relationships to pressure sensitive valves and spool valves such that the advance and the cut operations can be brought about in the desired sequential relationship without the use of any electrical component.

Considering now a typical operation of this portion of my invention, it is to be presumed that the piston of the ADV actuator is moving in FIG. 14 upwardly toward its retracted position, powered by hydraulic fluid being delivered from source $P_2$ via the crossed arrow spool of valve G and the hydraulic line 92. Spool valve G is held in the position illustrated in FIG. 14 by means of pressure $P_4$ manifested through the spool valve J and hydraulic line 93 when the spool of valve J is in the parallel arrow position.

Upon the piston of ADV actuator 22 reaching its extreme retracted position, upwardly in this instance, the pressure in the lower end of ADV actuator 22 "peaks", which pressure is sensed by pressure sensitive valve Q, with this permitting hydraulic pressure at say 1000 psi to manifest itself through line 94 through the spool valve I to the right hand end of spool valve H associated with the CUT mechanism, causing spool valve H to shift to the left position. Because of this latter valve positioning, pressure from $P_3$ is manifested through spool valve H to move the spool of spool valve F to the upper position shown in FIG. 14, so that hydraulic pressure from $P_1$ can manifest itself through the crossed arrows of spool valve F and hydraulic line 95 to the upper end of the CUT actuator 32. This causes the piston of the CUT actuator to move downwardly, and when it reaches the bottom of its travel, the pressure to the upper end of actuator 32 "peaks", at say 1500 psi, which is manifested in line 95 to cause the pressure sensitive valve L to permit fluid flow therethrough, which flow travels through line 96, so as to move the spool valve H toward the right.

The fluid displaced from the other end of spool valve H flows through spool valve I to the adjacent sump. This is possible because the same pressure moving spool valve H to the right also moves the spool of valve I to the right, so that the fluid displaced from spool valve H can flow as mentioned into the sump. Pressure in the upper end of the CUT actuator 32 is also manifested through line 97 to the right hand end of spool valve K, to shift it to the left as viewed in FIG. 14.

As a result of the spool of the spool valve H now being in the right hand position, the flow from $P_3$ can manifest itself through hydraulic line 98 to the upper end of spool valve F, shifting the spool of valve F downwardly so that oil flow from $P_1$ can manifest itself through the parallel arrow spool of valve F and hydraulic line 99 to the lower end of the CUT actuator 32, causing its piston to move upwardly, and retract the cutter blades from the sod.

Upon the piston of the CUT actuator reaching its uppermost end of travel, the hydraulic fluid in the lower end of the actuator "peaks", which is sensed by sequence valve N, which permits fluid pressure at say 1000 psi to be manifested through line 101 that is connected to spool valve K now in its left hand position. Line pressure manifested through spool valve K causes the spool of spool valve J to move to the left, such that system pressure $P_4$ is manifested through hydraulic line 102 to the upper end of spool valve G, causing it to shift downwardly such that $P_2$ is delivered through hydraulic line 103 to the upper end of the ADV actuator 22, to extend the piston of this actuator, thus advancing the conveyor belt and the sod carried thereon. This pressure in the upper end of the ADV actuator is also manifested through line 104 such that spool valve I is shifted back to its left hand position.

Upon the pressure in the upper end of the ADV actuator 22 "peaking", the sequence valve M permits a flow through line 105, which brings about a shifting of spool valve J back to the right, and spool valve K to the right also. This in turn permits $P_4$ to shift spool valve G back upwardly, so that $P_2$ can manifest itself on the lower end of ADV actuator 22, such that the advance arm 28 is caused to retract again. The cycle continues uninterruptedly until oil flow ceases.

Typically, my machine operates at the rate of from between 18 complete cutting cycles per minute, to approximately 22 cutting cycles per minute, with 20 cutting cycles per minute being an average. By suitable changes in the hydraulic flow supplied to my machine, a desired speed of operation can be achieved and maintained.

It is to be noted that pressures identified above as $P_1$ through $P_4$ are all from the same pressure source, commonly called "system pressure", and in a somewhat similar manner it is to be realized that all of the sumps depicted in FIG. 14 are in reality all the same location, often referred to as the "tank".

As should now be apparent, I have defined and described my novel sod cutter machine that will function automatically to cut sections of sod, typically coarse sod, placed at the inlet of the machine. These sod sections are carried by the conveyor belt in sequential relation to the cutter device, which functions to automatically cut the sod sections into smaller, symmetrically shaped pieces for ready packaging and subsequent sale.

Most significantly, I utilize a non-complex, rapidly operating machine utilizing a single pass cutter array made up of elongate blades secured together into a particularly strong arrangement that will cut through tough sod sections without distortion of the blades. Quite advantageously, the open blade design I utilize does not require the use of ejection devices for plug removal, and little operator experience is required to operate my machine effectively. Only a source of hydraulic fluid under pressure is required for the operation of my machine, and inasmuch as no electricity is required, it can be utilized in remote field locations. The only portions of my machine sensitive to dust and dirt are the CUT and ADV actuators and the posts 53 associated with the crosshead 50, and inasmuch as appropriate portions of each of these components are protected by suitable accordion pleated boots, the result is that my machine can operate in sandy environments for long periods of time without undue wear and without any significant amount of down time.

I claim:

1. A machine for automatically cutting large sections of coarse grasses into relatively small, hexagonally shaped pieces for ready packaging and subsequent transplanting, comprising sod advancing means in combination with sod cutting means, said sod advancing means being intermittently operative and serving to advance the sections of sod toward said sod cutting means, said sod cutting means involving the use of a plurality of closely grouped blade means arrayed in an open, non-linear configuration and designed to move periodically in unison downwardly into forceful cutting contact with sod to be cut, each blade of said blade means being elongate, with its cutting edge disposed at its lowermost portion, and with the cutting edges of said blades being located in a common plane, at least one side edge of each blade being in touching contact with the side edge of an adjacent blade, with said blades being disposed in such an array that adjacent cutting edges reside at approximately 120° angles to each other, such that together said cutting edges create an incomplete hexagonal pattern in which no closed areas are defined, such downward cutting movements being accomplished while said sod is momentarily stationary, such downward cutting movements being closely followed in each instance by an upward movement of said blade means, thereafter to permit the sod to advance for several inches preparatory for the next cutting cycle, means for coordinating the movements of said sod cutting means with the operation of said sod advancing means, such that forward movement of a section of sod is in each instance prevented until said blade means have accomplished the cut and are again clear of the section of sod being cut, whereby each time the cutting edges of said blade means contact a section of sod during a cutting movement, a plurality of relatively small, generally hexagonally-shaped pieces of sod are created.

2. The machine as defined in claim 1 in which the depth of cut is at least three inches.

3. The machine as recited in claim 1 wherein said sod advancing means and said sod cutting means are entirely hydraulic, operative from a common source of hydraulic power maintained at a selected flow rate.

4. The machine as defined in claim 1 in which the side edges of said blades being in touching contact serves to define a blade unit having high resistance to bending, and being capable of a several inch depth of cut.

5. The machine as defined in claim 1 in which the side edges of each abutting pair of blades are welded together to define a unitary, high strength blade array capable of a several inch depth of penetration.

6. A machine for automatically cutting large sections of coarse grasses into relatively small, symmetrically shaped pieces for ready packaging and subsequent transplanting, comprising a sod advancing means in combination with sod cutting means, said sod advancing means comprising an endless conveyor belt disposed below said sod cutting means, upon which belt, generally rectangular sections of sod can be deposited, belt advancing means for intermittently moving the sections of sod on said belt toward said sod cutting means, said sod cutting means involving a single pass cutter utilizing a plurality of closely grouped blade means designed to move periodically in unison downwardly into forceful cutting contact with sod to be cut into symmetrically shaped pieces, with such downward cutting movements being immediately followed in each instance by an upward movement, each blade of said blade means being elongate, with its cutting edge disposed at its lowermost portion, and with the cutting edges of said blades being located in a common plane, said blades being disposed in a unitary array wherein adjacent cutting edges reside at approximately 120° angles to each other, such that together said cutting edges create an incomplete hexagonal pattern in which no closed areas are defined, such downward cutting movements being accomplished while said belt is momentarily stationary, the downward cutting movements of said blades means being closely followed in each instance by an upward movement of said blade means, thereafter to permit the belt to advance for several inches preparatory for the next cutting cycle, said belt being operative in sequential relation with said sod cutting means, such that said belt is advanced for a few inches only after each upward movement of said cutting means, with forward movement of a section of sod in each instance being prevented by said belt advancing means until said blade means are clear of that section of sod.

7. The machine as recited in claim 6 wherein said sod advancing means and said sod cutting means are entirely hydraulic, operative from a common source of hydraulic pressure.

8. The machine as defined in claim 6 in which the depth of cut is at least three inches.

9. The machine as defined in claim 6 in which adjacent blades have side edges that are rigidly attached, so as to define a unitary blade unit having high resistance to bending, and being capable of a several inch depth of cut.

10. The machine as defined in claim 6 in which the side edges of each abutting pair of blades are welded together to define a unitary, high strength blade array capable of a several inch depth of penetration.

11. A blade array of the single pass type usable for cutting incrementally advancing sections of sod into relatively small plugs, said blade array involving a plurality of closely grouped elongate blades whose abutting sides are rigidly fastened together to form a high strength open blade array of a non-linear configuration in which no closed areas are defined, each of said blades having a lower cutting surface with a sharpened edge, with each sharpened edge residing at approximately a 120° angle to the sharpened edge or edges to which it is immediately adjacent, all of said sharpened edges residing in a common plane, said sharpened edges being designed to move in unison several inches downwardly into cutting contact with sod residing therebelow, such that sod sections forcefully contacted by said sharpened edges will be cut into relatively small plugs of sod.

12. The blade array as recited in claim 11 in which said blades together define an incomplete hexagonal pattern such that each time said blade array forcefully contacts a momentarily stationary section of sod being advanced incrementally, the sod will be cut into a plurality of generally hexagonally shaped pieces.

* * * * *